(12) United States Patent
Bevan et al.

(10) Patent No.: US 7,463,555 B2
(45) Date of Patent: Dec. 9, 2008

(54) TRI AXIS HIGH FREQUENCY FIBER OPTIC ACOUSTIC SENSOR

(75) Inventors: Dennis Bevan, Westlake Village, CA (US); Patrick Welton, Thousand Oaks, CA (US); Akbar Arab-Sadeghabadi, Santa Rosa Valley, CA (US); John Cappi, Reseda, CA (US); Liana Dang, Canoga Park, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 128 days.

(21) Appl. No.: 11/417,955

(22) Filed: May 4, 2006

(65) Prior Publication Data

US 2007/0258331 A1    Nov. 8, 2007

(51) Int. Cl.
*G01H 9/00*   (2006.01)
*G01B 9/02*   (2006.01)

(52) U.S. Cl. .................... 367/149; 73/655; 250/227.19; 356/477

(58) Field of Classification Search .................. 367/149, 367/178, 188; 250/227.14, 227.19; 356/477, 356/478; 73/655
See application file for complete search history.

(56) References Cited

U.S. PATENT DOCUMENTS

| 4,613,752 | A |   | 9/1986  | Davis                      |
|-----------|---|---|---------|----------------------------|
| 4,893,290 | A | * | 1/1990  | McNeel et al. ...... 367/178 |
| 4,893,930 | A |   | 1/1990  | Garrett                    |
| 5,010,531 | A | * | 4/1991  | McNeel .............. 367/188 |
| 5,155,548 | A |   | 10/1992 | Danver et al.              |
| 5,475,216 | A | * | 12/1995 | Danver et al. ..... 250/227.14 |
| 5,668,779 | A | * | 9/1997  | Dandridge et al. ..... 367/149 |
| 5,825,489 | A |   | 10/1998 | Lagakos et al.             |

FOREIGN PATENT DOCUMENTS

GB          2 386 687          9/2003

\* cited by examiner

*Primary Examiner*—Ian J Lobo

(57) ABSTRACT

A fiber optic acoustic sensor that detects pressure waves from all incident angles features multiple mandrels orthogonally disposed to provide omni-directional sensing capability. The topology of the mandrels prevents frequency response drop-off characteristic of cylindrical sensors at wavelengths smaller than ½ the length of the acoustic cylinder. The larger operating bandwidth and omni-directional sensing capability makes this fiber optic acoustic sensor a suitable choice for a wide range of applications.

26 Claims, 6 Drawing Sheets

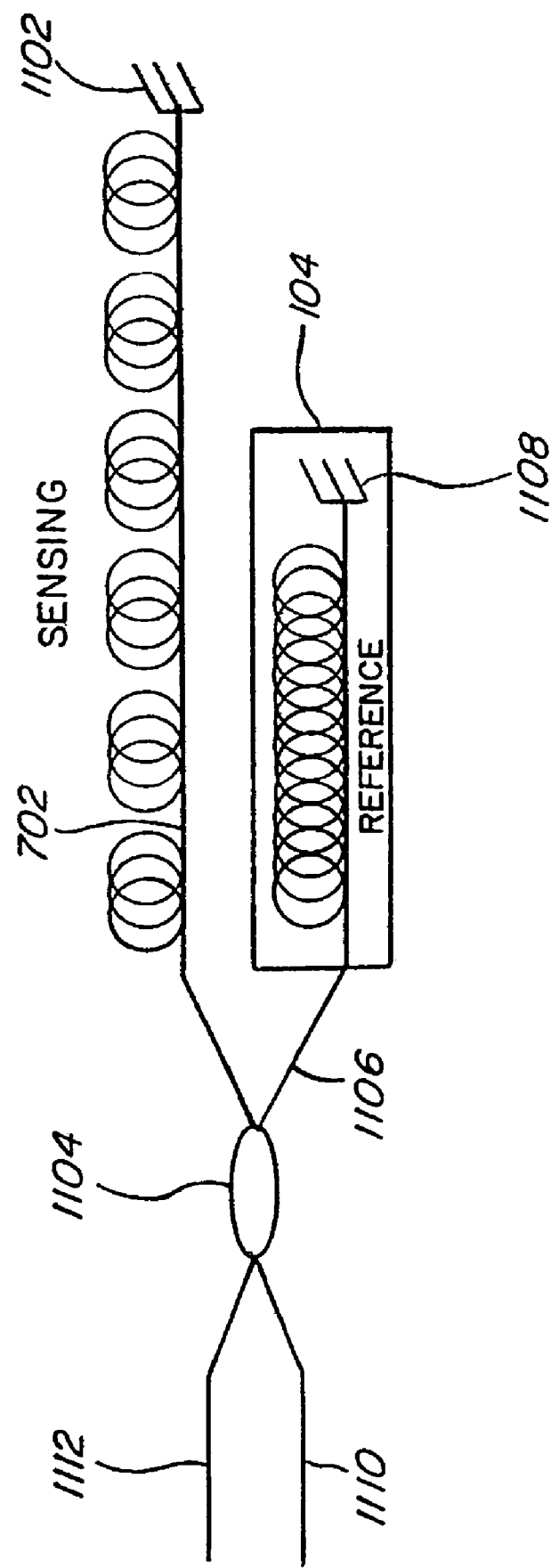
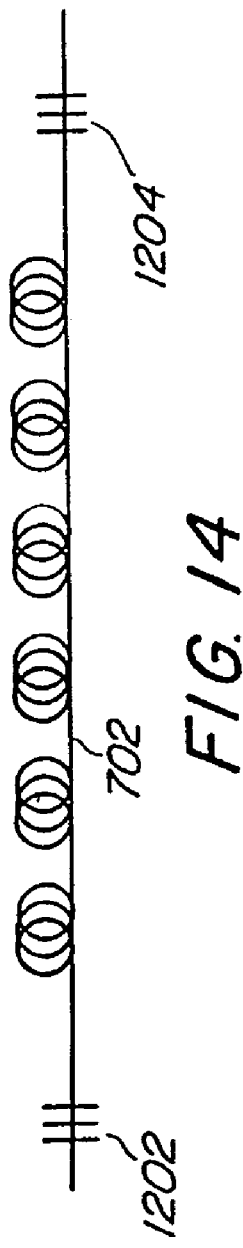
FIG. 13
FIG. 14

TRI AXIS HIGH FREQUENCY FIBER OPTIC ACOUSTIC SENSOR

BACKGROUND OF THE INVENTION

1. Field of the Invention

The invention relates generally to acoustic sensors. More particularly, the invention relates to acoustic sensors that feature optical fiber wound around a compliant structure.

2. Description of the Related Art

Conventional fiber optic acoustic sensors frequently feature a sensing arm and a reference arm that terminate at an optical coupler. The sensing arm consists of a first optical fiber wound tightly around a compliant mandrel. The reference arm consists of a second optical fiber of fixed length disposed in an environment where stresses are minimal. Under quiescent conditions (no acoustic wave) light introduced into both the sensing arm and the reference arm travels through the respective fibers and arrives at the coupler. The path length of the sensing arm and the reference arm are fixed, thus light from each arm will arrive at the coupler with a time invariant phase difference. Under these conditions, the output of the coupler (mixed light) will be a light wave of constant amplitude.

If an acoustic wave is introduced into the environment of the sensing arm, the compliant mandrel will respond to the acoustic wave by expanding and contracting, stressing the sensing fiber. The stress on the sensing fiber changes the path length of light traveling through the fiber, modulating the light, accordingly. At the same time, the reference arm's path length remains unchanged in response to the acoustic wave. When light from both arms is mixed the light amplitude will varies proportionally with the incident acoustic wave.

One of the problems with conventional fiber optic acoustic sensors is that the sensitivity and directivity of the acoustic measurement is dependent on the size and orientation of the compliant mandrel. As the acoustic wavelength approaches the length of the mandrel, the sensor's sensitivity rapidly decreases. To maintain a constant frequency response over the entire band of frequencies of interest, hydrophone designers generally limit the length (and the diameter) of mandrels to half the wavelength of the highest frequency of interest.

This size limitation on the length of the mandrels imposes a practical limit on the operating band of fiber optic acoustic sensors. As the frequency of interest increases, the wavelength of interest decreases, requiring the use of very small mandrels. With very small mandrels, the number of fiber optic windings that can be formed around the mandrel decreases resulting in less sensitivity. In practice, this problem makes fiber optic acoustic sensors based on fiber wound mandrels a poor choice for sensing frequencies above 50 KHz.

Another problem with conventional fiber optic acoustic sensors is the frequency response is dependent on the direction of arrival of the acoustic wave. Compliant mandrels often are more responsive to acoustic waves that impact the mandrel broadside (radial direction of the mandrel) and less responsive to acoustic waves that impact the endfire (longitudinal direction of the mandrel). This is because the mandrel diameter is usually smaller than its length.

There currently is a need for fiber optic acoustic sensors that can detect frequencies up to 100 KHz with a constant sensitivity over the entire frequency band. There is also a need for a fiber optic acoustic sensor that is able to detect acoustic waves arriving at the sensor from any spatial direction.

SUMMARY OF THE INVENTION

The invention accomplishes these goals by using multiple mandrels oriented along three orthogonal axes. A single optical fiber is tightly wound around all the mandrels to form a sensing arm. Light is introduced into the sensing arm and the phase shift is measured at the output of the sensing arm to determine strain in the fiber. Acoustic waves incident upon any one of the mandrel segments will induce a strain in the fiber resulting in a proportional phase shift in the light at the output of the sensing arm. The orthogonal arrangement insures that a significant component of any acoustic wave incident upon the sensing arm will be incident upon the broadside of at least one of the mandrels. This makes the invention less vulnerable to the frequency response drop-off that is characteristic of conventional sensors at wavelengths shorter than one half the mandrel length. The orthogonal arrangement of the present invention also increases the sensitivity of the sensor. Multiple mandrels allow more optical fiber windings over more compliant structure surface area. The topology of the mandrel layout also makes it inherently omni-directional. The present invention's frequency response is largely independent of the direction of the acoustic wave with the sensitivity being relatively constant over the sensors entire bandwidth. The length of the compliant mandrels can be increased to at least the wavelength of the highest frequency of interest without experiencing the sensitivity drop-off normally encountered at half the wavelength. Expansion of the sensitivity envelope obtained with the present invention makes fiber optic acoustic sensors a suitable choice for sensing acoustic frequencies up to at least 100 KHz.

BRIEF DESCRIPTION OF THE DRAWINGS

The exact nature of this invention as well as its objects and advantages will be readily understood upon consideration of the following specification as related to the attendant drawings wherein like reference numeral throughout the drawings indicate like parts, and wherein:

FIG. 13 is a schematic diagram of the sensing and reference arms of the preferred embodiment.

FIG. 14 is a schematic diagram of the sensing arm in another embodiment of the present invention.

DESCRIPTION OF THE PREFERRED EMBODIMENTS

In this description, "optical fiber" includes all flexible optical waveguides. An "optical coupler" includes optical beam splitters, combiners, and Bragg gratings. An "acoustic wave" means all pressure waves. An "acoustic sensor" includes hydrophones and pressure transducers.

Figure 1:
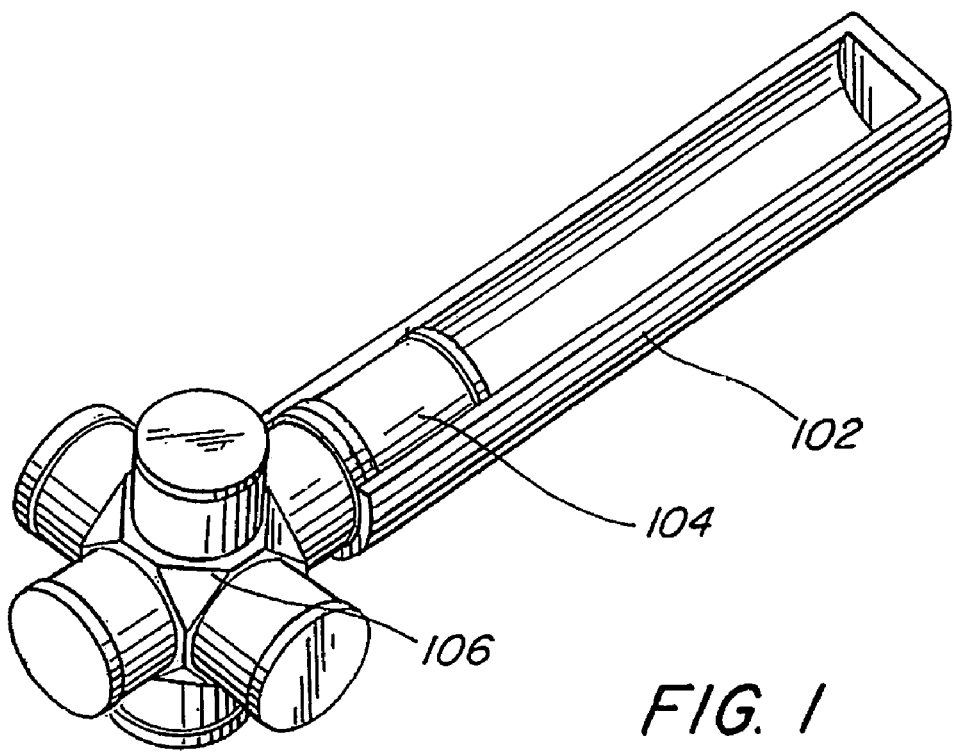
FIG. 1 is a perspective view of a preferred embodiment of the present invention.

FIG. 1 shows the preferred embodiment of the present invention. A housing 102 holds a reference arm 104 and associated optical couplers and splices (not shown). The housing 102 is attached to a midpoint sensor 106. The housing unit 102 is composed of a durable noncompliant material such as stainless steel to minimize stress on the reference arm 104.

Figure 2:
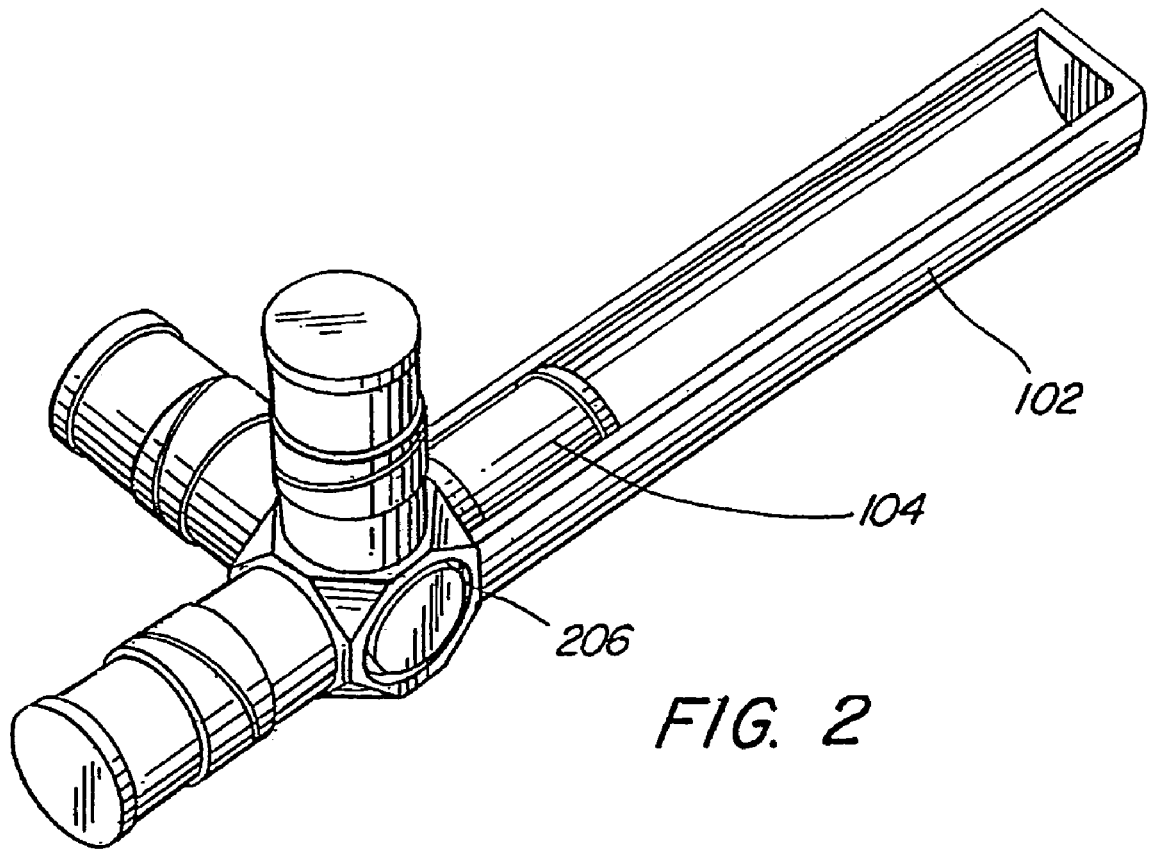
FIG. 2 is a perspective view of an alternate embodiment of the present invention.

FIG. 2 shows an alternate embodiment of the invention. A housing 102 holds a reference arm 104 and associated optical couplers and splices (not shown). The housing 102 is attached to an endpoint sensor 206.

Figure 3:
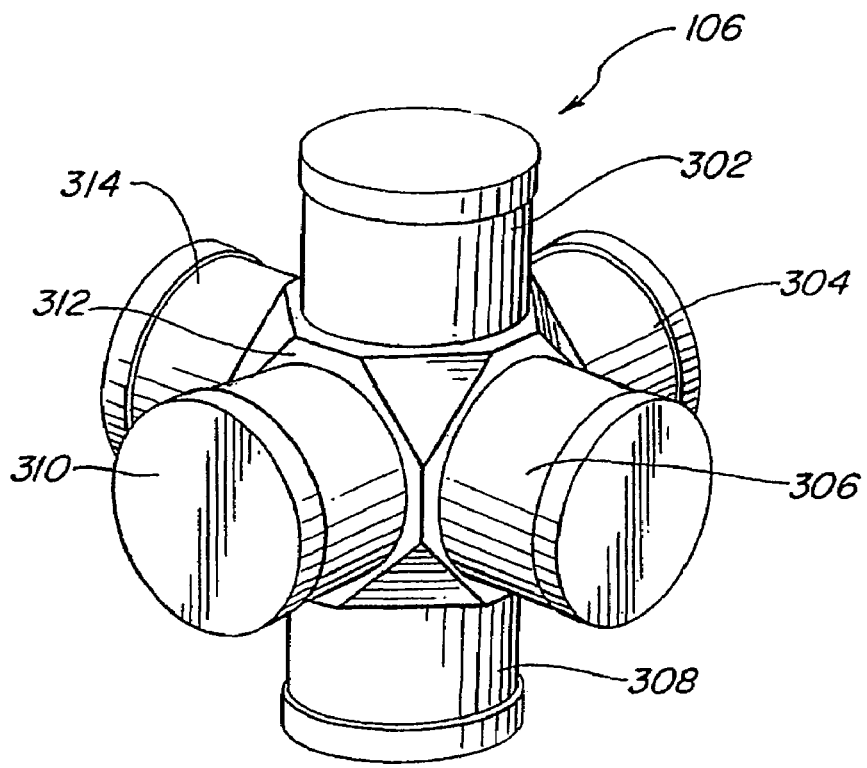
FIG. 3 is a perspective view of the midpoint sensor of the preferred embodiment of FIG. 1.

FIG. 3 shows the midpoint sensor 106. The first mandrel 302, the second mandrel 304, and the third mandrel 306 are nearly cylindrically shaped with the longitudinal axis of each mandrel orthogonal to the other mandrels. Extensions of the longitudinal axes meet at the center of the base 312. The fourth mandrel 308, the fifth mandrel 310 and sixth mandrel 314 are cylindrically shaped and mounted opposite the first mandrel 302, the second mandrel 304, and the third mandrel 206, with reflective symmetry. All six mandrels are mounted on the base 312 such that the longitudinal axes of the mandrel pairs lie on the coordinate axes of a Cartesian coordinate system with its center at the center of the base 312.

The benefit of sensor 106 can be seen most clearly for the case when an acoustic wave with a wavelength equal to the mandrel length impinges the endfire direction of a single mandrel. In a conventional sensor most of the acoustic energy is damped with the sensor being insensitive at that frequency and above. Using the present invention, an acoustic wave of that frequency incident on the endfire of a single mandrel must also be incident on the broadside of the other two mandrels. The response of the endfire will be damped but the other two mandrels will comply with the wave inducing strain in the optical fiber making the sensor sensitive at that frequency.

Figures 4, 5, 6:
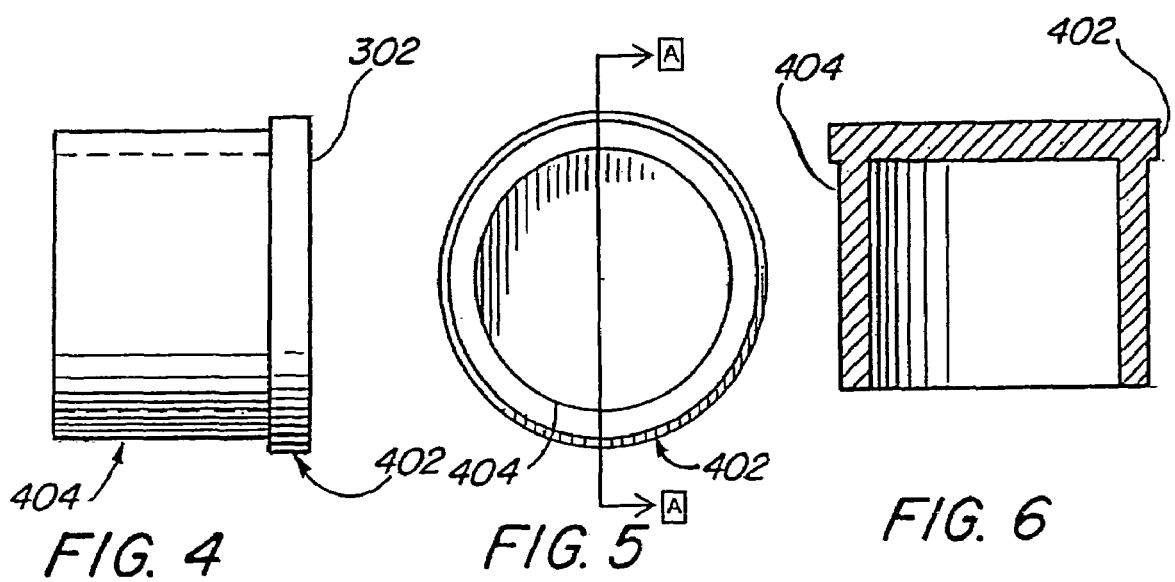
FIG. 4 is a side plan view of a mandrel
FIG. 5 is a bottom plan view of a mandrel.
FIG. 6 is a cross section of FIG. 5 taken along line A-A.

FIG. 4 shows a side view of the mandrel 302, which is the same as the other mandrels 304, 306, 308, 312, 314 of the midpoint sensor 106. A cover 402 of cylindrical shape defines the top of the mandrel. The bottom 404 is cylindrical. The longitudinal axis of the cover 402 and the bottom 404 are coincident.

All the mandrels 302, 304, 306, 308, 312, 314 are composed of any compliant material that allows the mandrels to expand and contract sympathetically with incident acoustic waves. The mandrels may be solid, air-backed, or fluid filled. The mandrels may be cylindrical spool shaped or any other shape that accommodates the windings of an optical fiber.

The mandrels may be larger than one half the wavelength of the maximum design frequency. For instance, a sensor with a maximum design frequency of 75 KHz (2.0 cm wavelength) might feature mandrels with lengths of 2.0 cm.

FIG. 5 shows a bottom view of the mandrel 302. The cover 402 has a slightly larger circumference than the bottom 404 with coincident center points.

FIG. 6 shows a cross section of the mandrel 302. The cover 402 and the bottom 404 define an inner cylindrical cavity.

Figure 7:
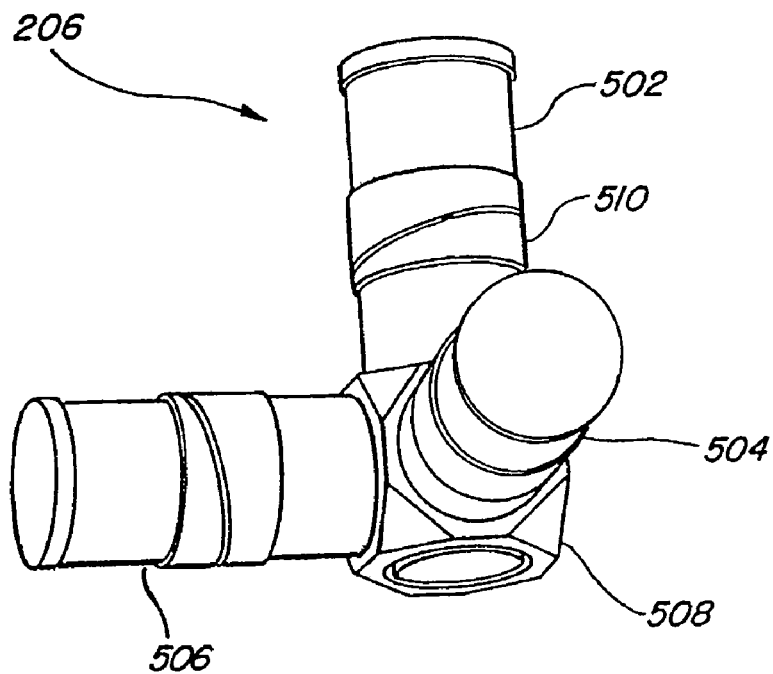
FIG. 7 is a perspective view of an endpoint sensor, an alternate preferred embodiment of the sensor of the present invention.

FIG. 7 shows the endpoint sensor 206. The first mandrel segment 502, the second mandrel segment 504 and the third mandrel segment 506 are nearly cylindrically shaped and mounted on a base 508 with the longitudinal axes of each of the mandrels orthogonal to each other. Extensions of the longitudinal axes meet at the center of the base 508.

The mandrel segments 502 504 and 506 are preferably two cylindrical mandrels of the first embodiment joined with a binding 510. The binding may be composed of any material that joins the mandrels. Other embodiments may feature mandrel segments 502 504 and 506 consisting of a single mandrel but twice as long as the six mandrels.

In the midpoint sensor 106, (FIG. 3) the mandrels 302 304 306 308 312 314 are mounted along orthogonal axes to minimize the spatial sensitivity variation common in many conventional sensors. Acoustic waves incident on the less sensitive endfire (longitudinal axis) of one mandrel impact the more sensitive broadside (radial axis) of the four other mandrels. Acoustic waves arriving from any direction will have a significant broadside component on at least two of the mandrels making the midpoint sensor 106 sensitive to acoustic waves arriving from any direction.

FIG. 3 shows a midpoint sensor 106. FIG. 7 shows an endpoint sensor 206. Other embodiments may contain sensors with any number of mandrels arranged in a variety of topologies. Although FIG. 3 and 7 show mandrels mounted with the longitudinal axes of the mandrel forming a tri-axis orthogonal topology, other embodiments may feature mandrels that are mounted on non-orthogonal axes. Embodiments featuring only two mandrel sensors at oblique angles offer considerable advantage over conventional sensors. The mandrels may be formed in a variety of shapes. Alternate embodiments feature mandrels that are cylindrical, spool shaped, conical, hour glass shaped, tapered with a varying perimeter length, or any other shape that is reactive to acoustic waves are contemplated.

Figure 8:
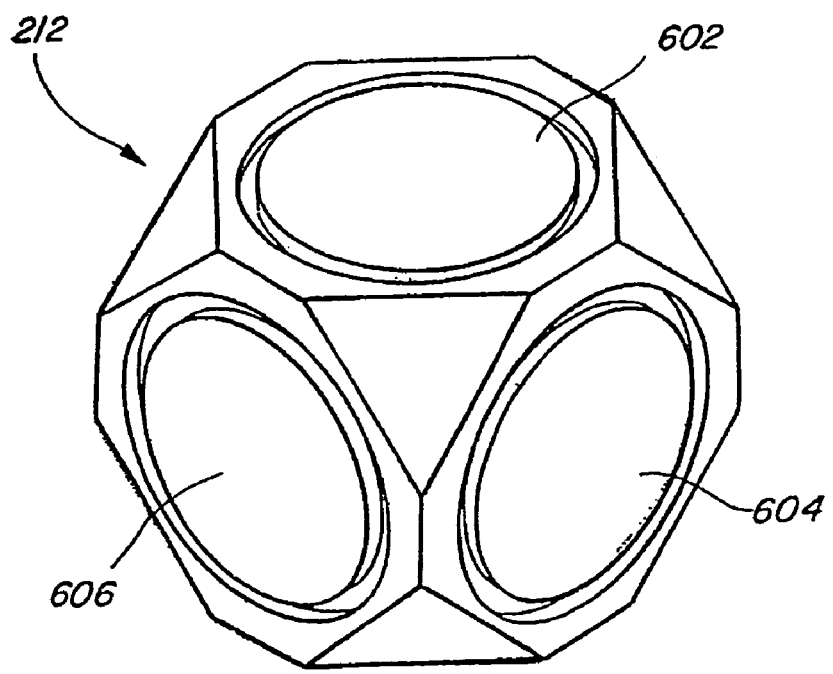
FIG. 8 is a perspective view of the preferred embodiment of a base for mounting the mandrels.

FIG. 8 illustrates the base 212 of the midpoint sensor 106. The base 212 is formed to have surfaces that accommodate six mandrels. The first mandrel 302 mates with a first surface 602, the second mandrel 304 with a second surface (not shown), the third mandrel 306 with a third surface 604, the fourth mandrel 308 with a fourth surface (not shown), the fifth mandrel 310 with a fifth surface 606, and the sixth mandrel 314 with a sixth surface (not shown). The order of the mandrels is not important.

Figure 9:
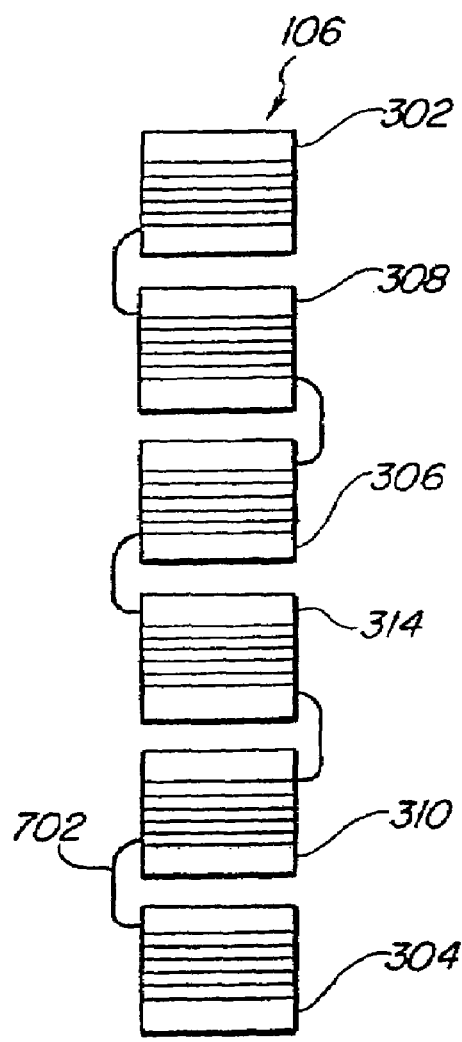
FIG. 9 is schematic diagram of the optical fiber windings around the mandrels of a midpoint sensor.

FIG. 9 shows the fiber optic winding of the midpoint sensor 106. A single sensing fiber 702 (fiber optic) is tightly wound around the first mandrel 302, the fourth mandrel 308, the third mandrel 306, the sixth mandrel, 314, the fifth mandrel, 310 and the second mandrel 304.

With a conventional sensor, optical fiber windings are limited to a single structure with a length less than one half the maximum sensing frequency. With the present invention, not only may the mandrel length be increased accommodating more windings per mandrel but the number of sensing mandrels is increased also. An acoustic wave having a significant component incident upon the broadside of single mandrel will also have a significant component incident on at least one other mandrel. If an acoustic wave is incident upon the endfire of a single mandrel it will also be incident on the broadside of the other two mandrels. Both compliant mandrels will react to the broadside wave inducing strain in the respective segments of the optical fiber. In this case, the sensitivity of the present invention would be twice that of a conventional sensor.

Figure 10:
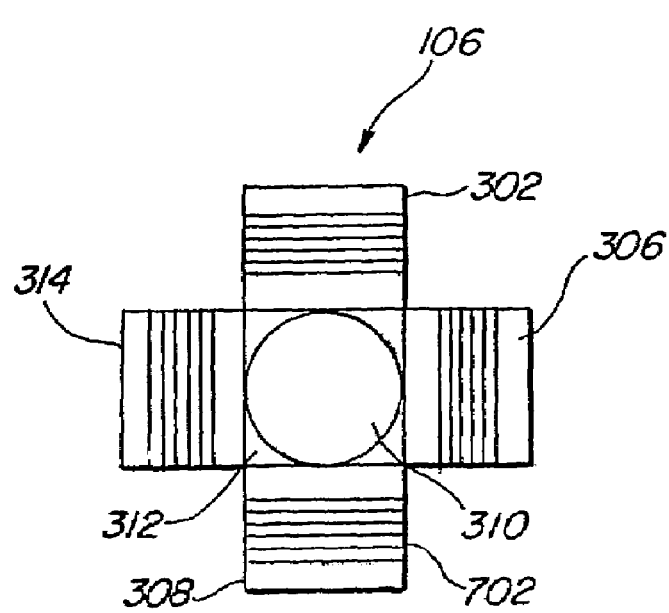
FIG. 10 is a plan form diagram of the optical fiber windings around the mandrels of a midpoint sensor.

FIG. 10 shows the topology of the windings around the midpoint sensor 106. The sensing fiber 702 is wound about three orthogonal axes. The first mandrel 302 and fourth mandrel 308 are mounted on opposite sides of the base 212 forming the first axis. The sixth mandrel 314 and the third mandrel 306 are mounted on opposite sides of the base 312 forming the second axis. The fifth mandrel 310 and second mandrel 304 (not shown) are mounted on opposite sides of the base 212 forming the third axis.

Preferably there are multiple windings around each of the mandrels with the windings tight enough to slightly strain the wave conducting portion (the fiber) of the sensing fiber 702 at each of the mandrels. Each of the windings increases the sensitivity of the sensor. The winding tension and the number of windings of the sensing fiber 702 at each of the mandrels is preferably identical making the sensitivity of the acoustic measurements similar for acoustic waves arriving from any direction.

The sensing fiber 702 may vary in composition in different embodiments. An optical fiber generally consists of an optical fiber surrounded by cladding. A tough buffer layer may be added with a plastic jacket to add strength to the fiber. Alternate embodiments may feature watertight coverings, casings, or shells that surround sensing fiber 702 while allowing the mandrels to deform with the applied acoustic wave. A secondary elastic covering may be applied over the midpoint sensor 106 or the sensing fiber 702 windings.

Figure 11:
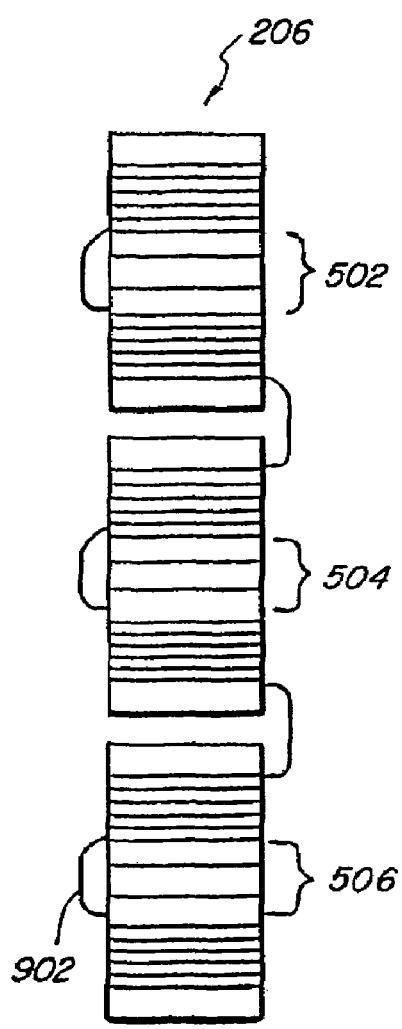
FIG. 11 is a schematic diagram of the optical fiber windings around the mandrels of the endpoint sensor.

FIG. 11 shows the fiber optic windings around the mandrels of an endpoint sensor 206. A single sensing fiber 902 (fiber optic) is tightly wound around the first mandrel segment 502 shown as two joint mandrels, the second mandrel segment 504 shown as two joint mandrels, and the third mandrel segment 506 shown as two joint mandrels. Preferably, there are multiple windings around each of the mandrel segments with the windings tight enough to slightly strain the wave conducting portion (the fiber) of the sensing fiber 902 at each of the mandrels.

Figure 12:
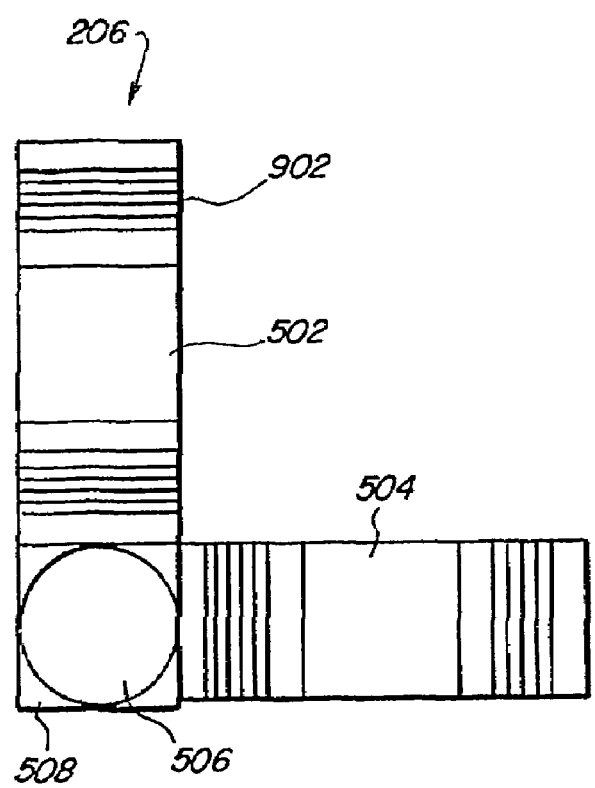
FIG. 12 is a plan form diagram of the optical fiber windings around the mandrels of the endpoint sensor.

FIG. 12 shows the topology of the windings around the endpoint sensor 206. The sensing fiber 902 is wound about three orthogonal axes defined by the first mandrel segment 502, the second mandrel 504 segment and the third mandrel segment mounted on base 508.

FIG. 13 shows the sensing arm 702 and the reference arm 104 of the preferred embodiment in a Michelson interferometer configuration. The sensing fiber 702 is wound around each of the mandrels with one end terminating at a first mirror 1102 and the other end terminating at an optical coupler 1104. The reference fiber 1106 is also an optical fiber of fixed length preferably isolated in a housing 102 to minimize strain on the light conducting portion (fiber) of the reference fiber 1106. One end of the reference fiber 1106 terminates at a second mirror 1108 and the other end terminates at the optical coupler 1104.

Components in the housing 102 may be potted with a hard resin epoxy and the entire invention may be molded over with a water resistant material such as polyurethane.

A collimated or laser light 1110 is introduced into the coupler 1104. Light traveling through the sensing arm will travel through the sensing fiber 702 to the first mirror 1102 and will be reflected back through the sensing fiber 702 to the coupler 1104. Light traveling in the sensing fiber 702 will be modulated by strains in the fiber caused by deformation or bending of any of the mandrels. Light from the reference arm will travel through the reference fiber 1106 to the second mirror 1108 and be reflected back to the coupler 1104. At the coupler 1104, light modulated from the sensing fiber 702 will mix with reference light from the reference fiber 1106 producing an interference pattern. The mixed light's 1112 intensity is proportional to the strain on the sensing fiber 702 and the acoustic forces acting on the mandrels.

FIG. 14 shows the present invention without a housing or a reference unit. The optical fiber 702 contains a first Bragg grating 1202 at one end of the sensing arm and a second Bragg grating 1204 at the other end of the sensing arm. Laser or collimated light traveling through the optical fiber 702 is introduced into the first Bragg grating 1202. Some of the light is reflected. The remainder of the light travels through the remainder of the optical fiber 702 and is reflected at the second Bragg grating 1204 returning through the sensing arm to the first Bragg grating 1202 where it is mixes with the reflected light. The mixed light's intensity is proportional to the strain on the sensing fiber 702 and the acoustic forces acting on the mandrels.

The invention thus expands the operating bandwidth of fiber optic acoustic sensors. The unique topology of the mandrels allows more windings and a flatter frequency response over the sensing range. The invention is more sensitive to acoustic waves and provides omni-directional sensing capability.

What is claimed is:

1. An acoustic sensor comprising:
   a base having a plurality of mandrel-accommodating surfaces;
   a plurality of compliant mandrels, each mandrel attached to a mandrel-accommodating surface on the base;
   a non-compliant housing containing an optical coupler, attached to the base;
   an optical fiber wound around the plurality of compliant mandrels terminating at the optical coupler; and
   a reference arm contained within the non-compliant housing.

2. The acoustic sensor of claim 1 wherein each of the plurality of compliant mandrels are oriented substantially orthogonal to the other compliant mandrels.

3. The acoustic sensor of claim 1 wherein the base has six mandrel accommodating surfaces.

4. The sensor of claim 3, wherein, when configured as a mid-point sensor, a compliant mandrel attaches to each one of the six mandrel-accommodating surfaces, forming three mutually orthogonal pairs of compliant mandrels.

5. The sensor of claim 4 where each mutually orthogonal pair of compliant mandrels has a longitudinal axis lying in a coordinate axis of a Cartesian coordinate system having an origin at the center of the base.

6. The sensor of claim 3 wherein, when configured as an end-point sensor, a compliant mandrel attaches to at least two mutually orthogonal mandrel-accommodating surfaces.

7. The acoustic sensor of claim 1 wherein the mandrels are solid.

8. The acoustic sensor of claim 1 wherein the mandrels are air backed.

9. The acoustic sensor of claim 1 wherein the mandrels are fluid filled.

10. The acoustic sensor of claim 1 wherein the mandrels are cylindrical, spool shaped, conical, hour glass shaped, or tapered with a varying perimeter length.

11. The acoustic sensor of claim 1 wherein the mandrels are cylindrical.

12. The acoustic sensor of claim 1 wherein the mandrels are spool shaped.

13. The acoustic sensor of claim 1 wherein the mandrels are hour glass shaped with a varying perimeter length.

14. The acoustic sensor of claim 1 wherein the mandrels are tapered with a varying perimeter length.

15. The acoustic sensor of claim 14 wherein the perimeter is larger than 1/8 of an inch and the free field sensitivity at a design maximum frequency is no less than half the sensitivity at one half the design maximum frequency.

16. The acoustic sensor of claim 1 wherein the dimension of the acoustic sensor along the longitudinal axis of one of the plurality of compliant mandrels is greater than ½ the wavelength of a frequency of interest.

17. The acoustic sensor of claim 1 wherein the optical fiber has a Bragg grating.

18. The acoustic sensor of claim 1 further comprising a Michelson interferometer or Mach Zehnder interferometer using the optical fiber as at least part of the optical path.

19. The sensor of claim 1 wherein the optical coupler includes one or more components selected from the group comprising optical beam splitter, optical combiner, and Bragg grating.

20. A high frequency acoustic sensor comprising:
a base having a plurality of mandrel-accommodating surfaces;
a plurality of compliant mandrels, each mandrel attached to a mandrel accommodating surface on the base;
a non-compliant housing attached to the base at a mandrel-accommodating surface, the housing containing an optical coupler and a reference arm;
first optical fiber wound around the plurality of mandrels, terminating at the optical coupler in the non-compliant housing; and
a second optical fiber wound around the reference arm in the non-compliant housing, terminating at the optical coupler.

21. The acoustic sensor of claim 20 wherein the length of the acoustic sensor measured in at least one direction is at least half the wavelength of a design maximum frequency and responds with a loss of less than half the sensitivity at one half of the design maximum frequency.

22. The acoustic sensor of claim 20, wherein each mandrel has multiple segments.

23. The acoustic sensor of claim 22 wherein the multiple segments of each mandrel are joined together by bindings.

24. The sensor of claim 20 wherein each compliant mandrel is selected from a group comprising solid, air-backed, and fluid filled.

25. The sensor of claim 20 further comprising a fixed mirror at the end of the first optical fiber and a second mirror at the end of the second fiber, forming a Michelson interferometer.

26. The sensor of claim 25 where the second mirror is in the non-compliant housing.

* * * * *